No. 826,622. PATENTED JULY 24, 1906.
J. A. SWINEHART.
SOLID RUBBER TIRE.
APPLICATION FILED OCT. 2, 1905.

ATTEST.
A. M. Moser.
R. B. Moser.

INVENTOR.
JAMES ALLEN SWINEHART.

BY H. V. Fisher ATTY.

UNITED STATES PATENT OFFICE.

JAMES ALLEN SWINEHART, OF AKRON, OHIO.

SOLID RUBBER TIRE.

No. 826,622.  Specification of Letters Patent.  Patented July 24, 1906.

Application filed October 2, 1905. Serial No. 280,916.

*To all whom it may concern:*

Be it known that I, JAMES ALLEN SWINEHART, a citizen of the United States, residing at Akron, in the county of Summit and State of Ohio, have invented certain new and useful Improvements in Solid Rubber Tires; and I do declare that the following is a full, clear, and exact description of the invention, which will enable others skilled in the art to which it appertains to make and use the same.

My invention relates to solid rubber tires for automobiles and other vehicles; and the invention consists in the construction of the tire, substantially as shown and described, and particularly pointed out in the claims.

Figure 1:
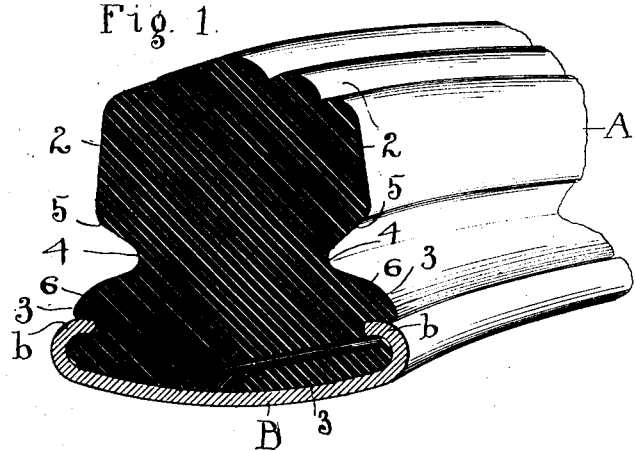
Figure 2:
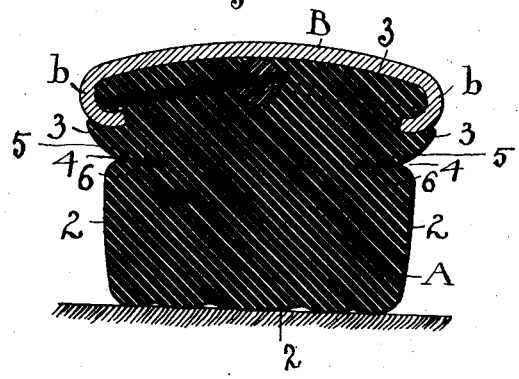

In the accompanying drawings, Figure 1 is a cross-section in perspective of a portion of a tire and rim united, showing the tire in its natural condition. Fig. 2 is a cross-section of the tire in inverted position as compared with Fig. 1 and as it appears when a heavy load is bearing thereon and the tire is compressed.

As shown in these views, the tire A is of substantially the same width from base to tread, with a circumferentially-ribbed periphery, preferably convex from side to side; but this particular formation of periphery is not in itself a material feature, and any suitable form of periphery may be used, whether ribbed or otherwise, but preferably of convex or rounded shape. It is to be noticed, however, that the tire is solid throughout and may be secured upon rim B in any well-known way. Furthermore and essentially, the tire is constructed substantially midway its elevation at either side between its tread or outer portion 2 and its base or inner portion 3 with channels or grooves 4 running along each side and having an aggregate-depth equal to approximately one-third of the cross-section of the tire at this point. This gives the tire spring or resiliency, which is not possible in a tire not thus channeled and reduced in sustaining power, because the narrowed central portion or core yields in a manner and to a degree which could not occur if said grooves were solid like the remainder of the tire. Then there is also the further and material advantage of having a construction which is peculiarly adapted to carrying heavy loads, because when pressure settles down on the tire and the spring action provided for is exhausted there is formed a flat broad sustaining-tread in which the side grooves or channels 4 are closed and the opposite shoulders or faces 5 and 6 thereof are brought together into mutual sustaining relations that extend through from the periphery down into the solid base of the tire.

The fact that the shape and form of the tire can be changed from the normal appearance or condition Fig. 1 to the compressed and wholly-altered form Fig. 2 shows how successfully the channels 4 perform their function, first, as contributing to the spring of the tire by reason of its being made more compressible thereby, and, secondly, by closing up and bringing the entire cross-section of the tire in supporting service when a heavy load is on, and thus also affording a wide tread, which is so desirable.

The channels 4 are substantially in the shape of a letter V in cross-section, except that they are shown as rounded rather than otherwise at their inner and smallest depth transversely, and the said form has been found to be admirably adapted to this purpose; but there may be more or less variation in the cross-sectional shape of the channel without departing from the spirit and purpose of the invention.

The rim B has inturned side edges b engaged in channels in the base of the tire, as is now common, and the upper portion of the base of the tire is built out over the said inturned edges in such way that a firm backing is given to the sides of the tire when the load is on, as in Fig. 2. This is an important feature of construction in a tire having side channels as in this case, because the holding up of the sides of the tire under a load is required to make channels like these practically available.

What I claim is—

1. As a new article of manufacture, a solid rubber tire of substantially the same width from base to tread having continuous V-shaped channels oppositely in its sides substantially midway the depth of the tire, said channels having opposite walls 5 and 6 adapted to close one upon the other when the tire is under the pressure of a load.

2. As a new article of manufacture, a solid rubber tire of substantially the same width from base to tread having channels oppositely in its base, whereby the tire is adapted to be secured to a rim, and provided with V-shaped channels in its sides between its base and periphery adapted to promote spring action in the tire.

In testimony whereof I sign this specification in the presence of two witnesses.

JAMES ALLEN SWINEHART.

Witnesses:
C. O. BAUGHMAN,
B. C. SWINEHART.